April 23, 1968  E. G. SLUSHER  3,379,279
MOBILE AERIAL PLATFORM
Filed July 18, 1966  2 Sheets-Sheet 1
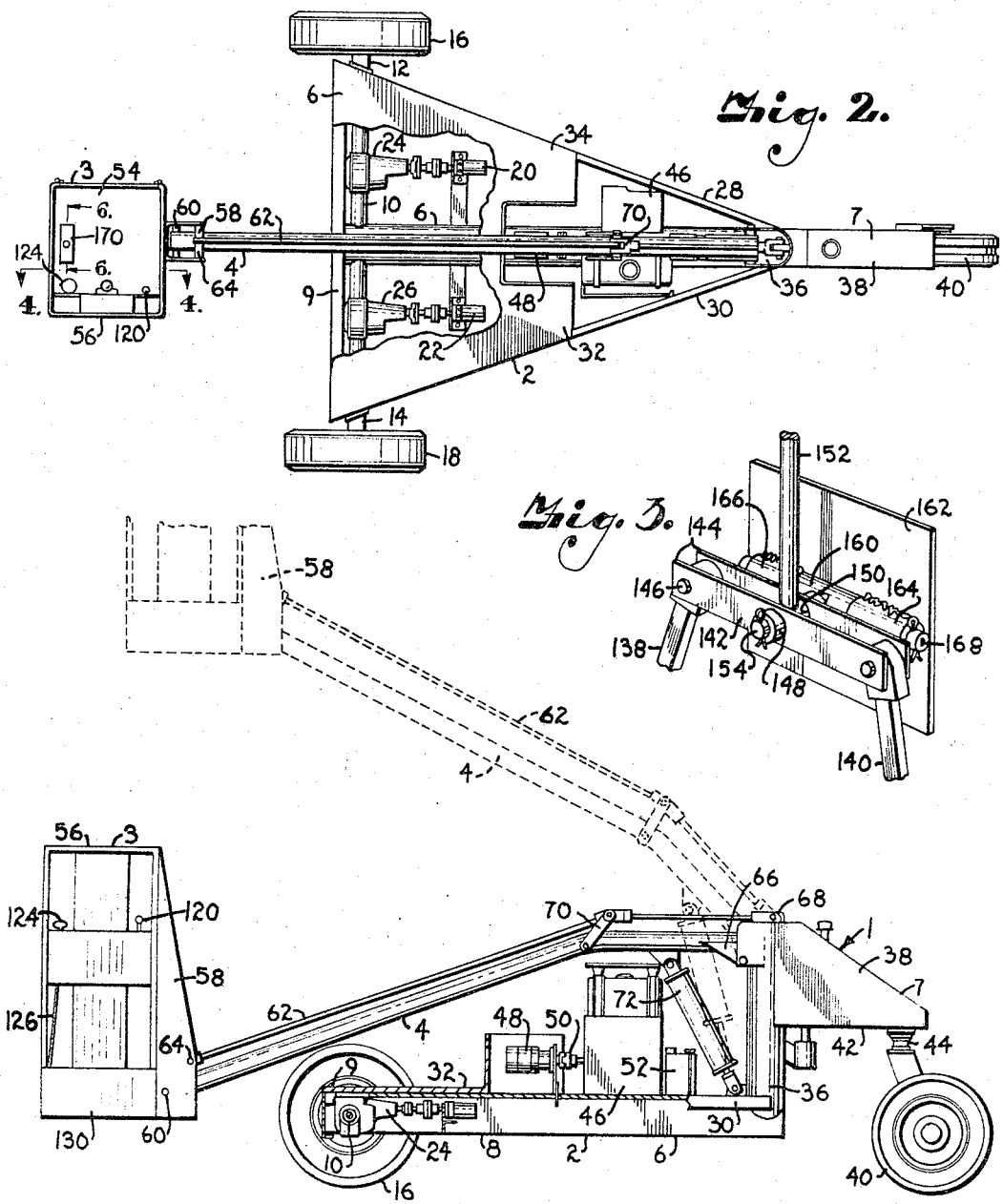
INVENTOR
EMMET G. SLUSHER
BY *Fishburn and Gold*
ATTORNEYS.

April 23, 1968
E. G. SLUSHER
3,379,279
MOBILE AERIAL PLATFORM
Filed July 18, 1966
2 Sheets-Sheet 2
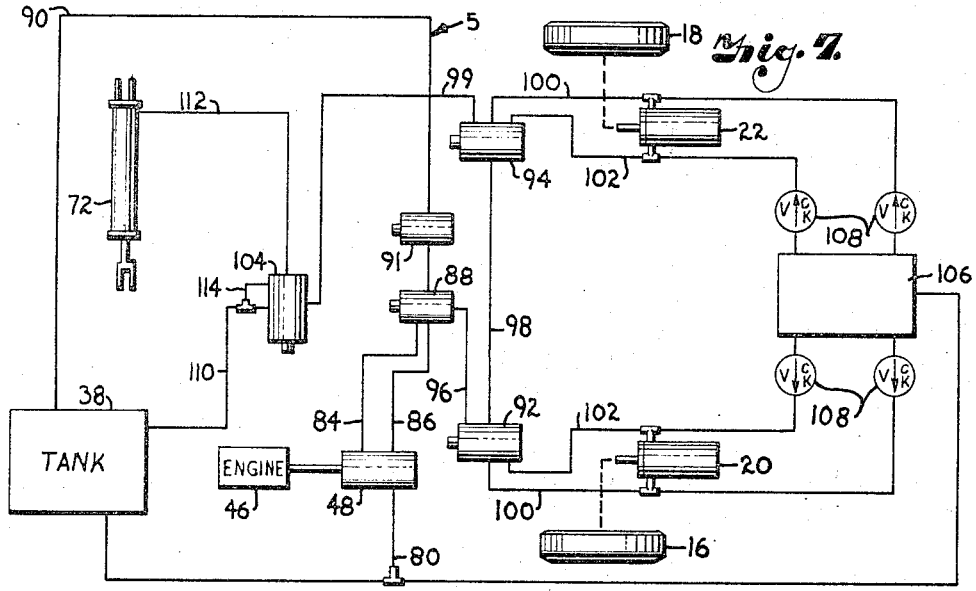
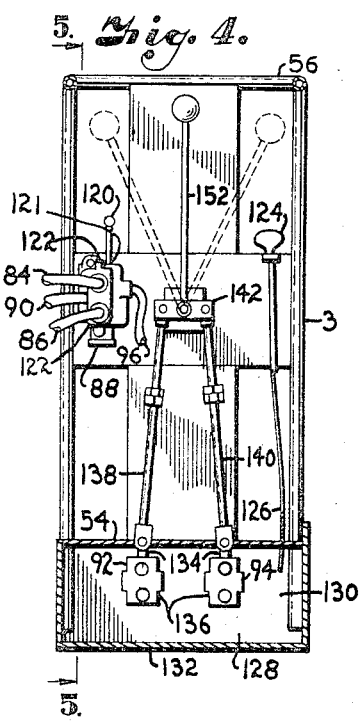
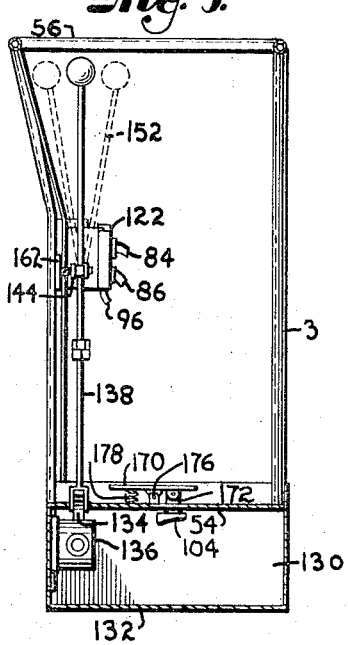
INVENTOR
EMMET G. SLUSHER
BY Fishburn and Gill
ATTORNEYS

United States Patent Office 3,379,279
Patented Apr. 23, 1968

3,379,279
MOBILE AERIAL PLATFORM
Emmet G. Slusher, 21st and Aull Lane,
Lexington, Mo. 64067
Filed July 18, 1966, Ser. No. 565,963
9 Claims. (Cl. 182—14)

ABSTRACT OF THE DISCLOSURE

A self-propelled mobile unit having an aerial platform for use in lifting personnel and equipment wherein the mobile unit has a frame including a generally T-shape structure of tubular material with spaced independently driven wheels at one end and a wheel with a caster mounting at the other end; a boom being pivotally mounted adjacent said other end on an upstanding member with the aerial platform carried at the free end of the boom with self-leveling connections thereto, said boom being bent whereby it can extend over the power plant in lowered position of the platform and provide a low silhouette for the entire structure. The power plant on the mobile unit driving a fluid pump for supplying fluid under pressure to motors having positive drive connections with the driven wheels with controls including valves on the aerial platform for controlling the fluid pressure moved to the motors thereby controlling the rate and direction of movement of the mobile unit, the valves being such that when moved to stop flow of fluid to the motors it locks the flow and serves as a brake preventing movement of the mobile unit. The control valves have a single lever arrangement for controlling direction of movement. The mobile unit has a fuel tank at the end on which the caster wheel is mounted to serve as a counterweight to the aerial platform to aid in stability of the unit.

---

This invention relates to a mobile unit for controllably elevating and moving personnel and equipment to desired locations and more particularly, to a self-propelled mobile unit having an aerial platform for use in lifting personnel and equipment for such operations as tree trimming, painting, warehousing and fruit picking.

In such operations as pruning, thinning and picking in orchards or the like, the volume of output by a single worker can be tremendously increased by the utilization of a mobile aerial platform which will lift and move the worker to any desired location and elevation with speed and ease of maneuverability. Because of the obstacles and restrictions normally encountered in orchard type environments, it is essential that a unit of this type be highly maneuverable and precisely controllable in order to rapidly move an aerial platform to a desired location avoiding entanglements with the limbs and the like. It is also important that the unit be precisely controllable from the aerial platform by the worker utilizing the unit such that other workers are not required to maneuver the unit to the desired location.

The principal objects of this inveniton are: to provide a new and improved mobile unit or vehicle having an aerial platform for use in lifting and moving personnel and equipment to desired locations; to provide such a unit having a lower silhouette for ease of movement about areas such as orchards where low hanging branches and undergrowth tend to obstruct the movement of the unit; to provide such a unit having a reduced width forwardly of the unit greatly facilitating the movement of the vehicle into areas obstructed by underbrush or low hanging tree limbs; to provide such a unit employing a pair of rearwardly located driven wheels and a single forwardly located wheel allowing a reduced thickness in the unit at the forward portion with the aerial platform operatively connected to a longitudinally extending boom member, said boom being swingably mounted at the forward portion of the unit, centered over said unit and extending rearwardly thereby providing increased stability such that the danger of overturn of the unit is considerably diminished; to provide such a unit having a caster wheel at the forward portion thereof and an overall balanced construction such that on severe slopes should the unit tend to overturn, the balanced construction and the caster wheel cause the unit to automatically vary its direction to compensate for the weight overload in the direction of overturn and effectively maintain the unit in an upright position; to provide such a mobile unit being fully controllable from the aerial platform such that a single worker may utilize and operate the unit; to provide such a unit having a pair of independently driven wheels separately actuated by a pair of hydraulic motors, said motors being fully controllable from the aerial platform; to provide such a unit having a directional control lever on the aerial platform to control the flow of hydraulic fluid to the motors and wherein the release of said lever automatically locks the wheels of the unit by producing a static condition to the flow lines, thereby eliminating the necessity of providing separate braking means; to provide such a unit employing a variable volume hydraulic pump to provide an automatic transmission-like speed reduction with the engines at full power allowing the engine to operate at a maximum efficiency; to provide such a unit wherein the boom is always centered above the vehicle with complete capability of boom movement afforded by the independently actuated driven wheels which may revolve in either the same or opposite directions to effect forward or rearward movement or turning on a small radius; to provide such a unit generally lacking in chains, pulleys or belts which are susceptible to entanglement with limbs or the like; to provide such a unit having a tubular frame and boom to allow the enclosure of all hydraulic hoses to avoid entanglement of said hoses and resulting damage thereto; to provide such a unit for the precise and rapid movement of an aerial platform to effectively increase labor output and thereby decrease labor costs.

Other objects and advantages of this invention will become apparent from the following description taken in connection with the accompanying drawings wherein are set forth by way of illustration and example certain embodiments of this invention.

FIG. 1 is a side elevational view of the mobile unit including an aerial platform, said unit embodying the features of this invention, said aerial platform being illustrated in an upwardly extending position by dotted lines.

FIG. 2 is a plan view of the unit illustrated in FIG. 1 having a portion of the frame cover plate broken away to illustrate a pair of separately driven hydraulic motors operatively connected to a pair of independently driven rear wheels.

FIG. 3 is a fragmentary perspective view of the control means employed on the aerial platform for controlling the flow of hydraulic fluid through the hydraulic motors.

FIG. 4 is a vertical sectional view taken on line 4—4 of FIG. 2 illustrating a control valve for control of the flow volume from the variable volume pumping means, a control means operatively connected to a pair of control valves for directional control of the unit with the control lever shown in an upright and a pair of angularly disposed positions, one of said angular positions indicating forward movement of the unit and the other of said angular positions indicating a rearward movement of said unit.

FIG. 5 is a vertical sectional view taken on line 5—5 of FIG. 4 with said control lever shown in an upright and a pair of angularly disposed positions with one of said angular positions indicating a turn of said unit to the left and the other of said positions indicating a turn of said unit to the right.

FIG. 6 is a vertical sectional view taken on line 6—6 of FIG. 2 illustrating a control valve and a foot pedal for actuating said control valve, said valve being employed to control the elevation of said aerial platform.

FIG. 7 is a schematic view of the hydraulic system employed for driving the unit illustrated in FIG. 1.

Referring to the drawings in more detail:

The reference numeral 1 generally designates an apparatus for deploying personnel and equipment embodying the features of this invention and being generally comprised of a vehicular portion 2 and an aerial platform or bucket 3 with said aerial platform 3 being operatively connected to the vehicular portion 2 by means of an angular boom 4 swingably connected to each of the vehicular portions 2 and the aerial platform 3. A control system 5 has means housed in the aerial platform or bucket 3 for complete control of the movement of the vehicular portion 2 in the aerial platform 3 thereby allowing complete operation of the unit by a single worker.

The vehicular portion 2 includes a vehicular frame 6 being generally T-shaped having a forward portion 7 and a rearward portion 9, said frame being comprised of a stem member 8 and a cross bar member 10. The members 8 and 10, as illustrated, are tubular in form and suitably connected as by welding in a normal relation with the cross bar member 10 being employed to house a pair of independent axle members 12 and 14 suitably retained within the tubular member 10 and operatively connected to a pair of driven wheels 16 and 18 respectively. The axles 12 and 14 are also suitably connected to and driven by a pair of hydraulic motors 20 and 22 respectively through a pair of differentials 24 and 26 respectively, integrally formed with the cross bar member 10. The hydraulic motors 20 and 22 may be reversibly driven in an independent manner responsive to control from the aerial platform or bucket 3.

The vehicular portion 2 further includes a pair of side braces 28 and 30 which extend from the opposed outer ends of the cross bar member 10 to the forward end portion of the stem member 8 and are employed for supporting a cover plate 32 which provides a supporting surface 34 over the vehicular frame 6. The supporting surface 34 may be employed in various operations, for instance, supporting large containers during picking of fruit or other commodities to receive the commodity and for transporting the commodity to a collecting point. The novel arrangement of the various parts of the vehicular portion 2 of the apparatus 1 and the central disposition of the boom member 4 supporting the aerial platform 3 allows for a large useable supporting surface 34 susceptible to a variety of utilizations.

The vehicular frame 6 also includes a vertical supporting member 36 operatively secured to the stem member 8 at the forward portion thereof with said member 36 being employed as a mounting to support the swingable boom 4 which is operatively connected to the aerial platform 3. The frame member 6 also includes a tank defining portion 38 for hydraulic fluid which extends forwardly of the vertical support 36 and being suitably secured thereto as by welding to serve both as a hydraulic fluid tank for the apparatus 1 and as a mounting member or support for a caster wheel 40 which is mounted at the forward portion 7 of the vehicular frame 6. The caster wheel 40 is suitably mounted to the undersurface 42 of the tank defining portion 38 of frame 6 by a suitable connection 44 to allow a free rotational movement of the caster wheel 40 through a 360-degree rotation. The vehicular portion 2, as illustrated, has a pair of spaced driven wheels 16 and 18 located at its rearward end portion 9 with a caster wheel 40 suitably mounted at its forward end portion 7 to thereby permit the turning of the apparatus 1 by the forward or rearward movement of either one of the driven wheels 16 or 18 or by a cooperative association of movement of said driven wheels 16 and 18 with one of said wheels being driven forwardly and the other of said wheels being driven rearwardly. In the latter instance, the turning radius of the apparatus is extremely small, thereby effectively increasing the maneuverability of the apparatus 1 in close areas as would be found in such environments as orchards and the like.

The vehicular frame 6 serves as a supporting means for a prime mover or engine 46 which is operatively connected to a hydraulic pump 48 by a suitable coupling 50 to actuate pump 48 for providing fluid pressure throughout the hydraulic system employed on the apparatus 1. As illustrated, the engine 46 is suitably connected to the stem member 8 of the vehicular frame 6 and is supported thereon along with the hydraulic pump 48. The battery 52 is also illustrated as being supported in overlying relation to the stem member 8. The employment of the engine 46, the pump 48 and the battery 52 in this central position directly over the frame member 6 tends to centralize the weight distribution of the vehicular portion 2 directly over the central frame member 8 thereby effectively increasing the stability of the apparatus 1.

The aerial platform 3 includes a supporting member 54 having an upstanding circumferentially extending framework 56 suitably connected thereto forming an open compartment in which the operator of the apparatus 1 stands on the supporting member 54 for controlled movement to desired locations. The framework 56 includes a side support 58 to which the boom member 4 is swingably mounted on a pivot rod 60 suitably connected to the side support 58. A guide member 62 extending longitudinally along in spaced relation to the boom 4 is also swingably mounted to the side support 58 of the aerial platform 3 by means of a pivot rod 64 suitably connected to the side support 58 and employed to maintain the aerial platform 3 in an upright position regardless of the angular disposition of the boom member 4.

Each of the boom member 4 and the guide member 62 are swingably mounted to the vertical support portion 36 of the vehicular frame 6 by means of pair of pivot rods 66 and 68 respectively with a center swingable linkage member 70 swingably mounted to each of the guide members 62 and boom member 4 to maintain the guide member 62 and the boom member 4 in a desired relation as the boom member 4 is elevated and lowered by an actuating hydraulic cylinder 72 swingably mounted to the boom member 4 and the vehicular frame 6. Referring to FIG. 1, the relationship of the boom member 4 and the guide member 62 is illustrated with the boom member 4 extended in an elevated position above the vehicular frame 6. It should be noted that the spacing between the guide member 62 and the boom member varies as the boom member 4 is elevated above the vehicular portion 2, said spacing being controlled by the central linkage 70.

Referring to FIG. 7, the hydraulic system 5 for control and operation of the apparatus 1 is illustrated and is suitably adapted to provide complete control by an operator in the aerial bucket or platform 3. The engine 46 is employed to drive the variable volume hydraulic pump 48 which, as illustrated, is a double hydraulic pump having a suction intake line 80 operatively connected to the tank or reservoir 38 and a pair of output lines 84 and 86 operatively connected to a control valve 88.

In the illustrated embodiment, the double hydraulic pump 48 is employed to produce either 3, 6 or 9 gallons per minute to effect the desired pressure and volume in the hydraulic system 5 as selected through the control valve 88. The outflow lines 84 and 86 allow passage of hydraulic fluid at 3 and 6 gallons per minute respectively and this volume may be used in combination at the control valve 88 or separately. The control valve 88 is operatively connected in series through a pair of motor control valves 92 and 94 respectively which are operatively connected to the hydraulic motors 20 and 22 respectively, said valve 88 also being connected to a control valve 91 for operation of equipment carried on the platform 3 such as a pruning device.

The motor control valve 92 has an intake line 96 operatively connected to the transmission control valve 88 to receive hydraulic fluid. The outflow line 98 is operatively connected to the motor control valve 94 as an intake line such that fluid flows serially through valve 92 to valve 94. A return line 99 is operatively connected to the tank 38 through the boom control valve 104 which is actuated for providing hydraulic fluid pressure to the hydraulic cylinder 72 for raising and lowering the aerial platform 3, said line 99 also being connected to the control value 94. Each of the control valves 92 and 94 have outflow lines 100 and 102 operatively connected thereto and to one of the motors 20 and 22 on opposed ports thereof to drive said motor in a direction dependent upon the flow of hydraulic fluid through the control valves 92 or 94. Each of the motors 22 and 20 are operatively connected to a fluid distributor 106 which is employed for furnishing hydraulic fluid to the motors 20 and 22 through a plurality of check valves 108 and obtaining said fluid through the suction line 80 to the hydraulic pump 48. When the apparatus is directed down grade, the motors 20 and 22 react as hydraulic pumps moving fluid back into lines 100 and 102. The distributor 106 allows the pumping action of the motors 20 and 22 to draw fluid through the check valves 108 and pump intake line 80 thereby preventing the motors 20 and 22 from cavitating thereby causing free wheeling of one or both of the the driven wheels 16 and 18. As the direction of rotation of the hydraulic motors 20 and 22 are controlled by the diversion of hydraulic fluid through either of the outflow lines 100 and 102 from the respective control valves 92 and 94, the driving motion of the respective wheels 16 and 18 is independently controlled by the motor control valves 92 and 94.

The control valves 92 and 94 may be placed in a neutral position, diverting the fluid flow through the outflow line 99, the boom control valve 104 and a return line 110 to the tank 82. With the motor control valves 92 and 94 in any position, the boom control valve 104 may be actuated to divert the flow of hydraulic fluid from the flow line 99 through a flow line 112 to the hydraulic cylinder 72 for raising the boom 4 to an elevated position. The boom 4 may be lowered by actuating the control valve 104 in an opposite direction to open an outflow line 114 to the flow line 112 allowing the hydraulic cylinder 72 to drain to the tank 82 through line 110 thereby permitting the weight of the aerial platform 3 and its operator to be controllably lowered by the hydraulic cylinder 72.

Referring to FIGS. 4 through 6, the aerial platform 3 is illustrated to show the disposition of the control valves 92, 94, 88 and 104 and their actuating means for control of the apparatus 1. The transmission control valve 88, employed to select the pressure to be transferred to the hydraulic motors 20 and 22 or to direct fluid pressure to the control valve 91 for a pruning apparatus or other equipment carried on the aerial platform 3, is illustrated as a conventional spool control valve having a handle 120 for actuating a spool 121 to the desired position within a valve casing 122 to facilitate a corresponding directional flow of the hydraulic fluid through the system 5. The aerial platform 3 also has mounted therein a cable control knob 124 operatively connected to a control cable 126 which is, in turn, connected to the engine 46 for varying the engine speed.

The control valves 92 and 94 employed for control of the hydraulic motors 20 and 22 are housed in a compartment 128 in the lower portion of the aerial platform 3 defined by the supporting member 54, a plurality of side walls 130 and a lower panel 132, said compartment 128 also housing the control valve 88. The control valves 92 and 94 are conventional in nature being of a spring loaded spool type, each having a spool 134 reciprocally movable within a casing 136 responsive to a push-pull action or force imposed on the spool by means of a pair of linkages or arms 138 and 140 swingably connected to the control valves 92 and 94 respectively. The spools 134 are spring mounted such that a release of pressure on the spools causes said spools to return to a neutral position which, in this instance, effects a flow of hydraulic fluid from the control valves 92 and 94 through the return lines 99 and 110 to the tank 82. In the illustrated embodiment, the control valves 92 and 94 are reversely mounted in that a depresssion of the spool 134 in the casing 136 effects a forward motion on the driven wheel 16 whereas an upward or outward force on the spool 134 of the control valve 94 effects a similar forward motion on the driven wheel 18.

The spools 134 of the control valves 92 and 94 are actuated reciprocally by means of the upward and downward movement of the arms 138 and 140, said movement being effected by the pivoting of a pivot arm or linkage 142. As illustrated best in FIG. 3, the pivot arm 142 is comprised of a pair of opposed spaced longitudinally extending plates or strips 144 secured in spaced relation by a pair of pins or rods 146 disposed at opposed ends of the pivot arm 142 and a centrally located cylindrical transversely extending pivot member 148 which is suitably secured to each of said plates 144 through a pair of aligned apertures 150 in said plates 144. The cylindrical pivot member 148 has a control arm 152 operatively connected thereto and in a neutral position extending in an upright manner above the pivot arm 142. The pivot member 148 receives a transversely extending pivot pin 154 through its central portion and is rotatable about said pin 154 in such a manner as to rotate the longitudinal pivot arm 142 about a central point thereby selectively raising and lowering the opposed end portions of said pivot arm 142 thereby raising and lowering the linkages 138 and 140 to raise and lower the spools 134 in the control valves 92 and 94 respectively. As the control valves 92 and 94 have spring loaded spools 134, when pressure is released on the control arm 152, the springs return the spools to a neutral position, thereby effecting a static condition within the hydraulic motors 20 and 22 imposing a braking action on the driven wheels 16 and 18. It is in this manner that the apparatus 1 is stopped and through this means that the necessity of external braking systems is avoided in an apparatus of this type. An operator then, facing rearwardly, while standing on the aerial platform 3 may direct the control handle 152 in either a forward or rearward direction thereby revolving the cylindrical member 148 about the pivot pin 154 causing the apparatus 1 to move in a corresponding direction to that of the movement of the control handle 152.

The pivot pin 154 upon which the cylinder 148 revolves effecting the pivoting action of the pivot arm 152 for raising and lowering the arms or linkages 138 and 140 is operatively connected to a second pivot member or pivot cylinder 160 which is employed for raising or lowering both of the arms 138 and 140 simultaneously to thereby effect a rearward movement of one of the driven wheels while effecting a forward movement of the other of said wheels to cause said apparatus 1 to turn about the center point between the two driven wheels 16 and 18. A frame member 162 is suitably mounted to the open frame 56 of the aerial platform 3 and has welded thereto a pair of retaining cylinders 164 and 166 in opposed spaced relation defining a generally horizontal longitudinally extending through bore which receives a second longitudinal pivot pin 168 to allow the retention of the cylindrical pivot member 160 on said pivot pin 168 between the opposed spaced retaining cylinders 164 and 166 such that the cylindrical pivot member 160 is free to rotate about the pivot pin 168 thereby allowing a transverse movement of the control handle 152, that is, transversely to the longitudinal lever arm 142 and the apparatus 1 to permit a turning action of the apparatus 1 in the direction in which the operating handle 52 is displaced. As illustrated in FIG. 5, the operating handle 152 could be displaced to either the right or left of the operator facing rearwardly in the aerial bucket 3, thereby effecting a movement of the bucket 3 in the direction in which the operator points or moves the control handle 152. As the control handle 152 is operatively mounted on a pair of normally oriented pivot points, the handle 152 may be moved to a combination position wherein the handle 152 is moved either forwardly or rearwardly of the operator and to either the right or left effecting a turning action of the apparatus 1. This turning action differs from that previously described in that only one wheel is being driven either forwardly or rearwardly dependent upon the disposition of the handle 152 and the other wheel serving as a pivot point for the apparatus 1.

It should be noted that any movement of the aerial bucket 3 desired by the operator standing within said bucket and facing rearwardly of the apparatus 1 may be effected by simply moving the control handle 152 in the direction of the desired movement, thereby avoiding confusion as to what movement of the handle 152 effects a particular movement of the apparatus 1. This particular point is extremely important in that the operator may have the aerial platform 3 in various tight positions among the limbs of a tree or otherwise wherein a movement in an improper direction could cause the operator to strike the tree himself or with the aerial platform 3 resulting in possible injury to the operator and damage to either the apparatus 1 or the tree or other objects in the vicinity. The new and novel control mechanism for the aerial platform 3, therefore, provides a simple, inexpensive and dependable control apparatus for accurate and precise movement of the aerial platform from an operator disposed within said platform in elevated positions above the ground.

In the illustrated embodiment, the boom member 4 is actuated by the passage of hydraulic fluid to a hydraulic cylinder 72 controlled by a foot pedal 170 to raise or lower a spring loaded spool 172 within a housing 174 of the control valve 104. The foot pedal 170 is swingable about a pivot axis 176 and is automatically returned to a neutral position by means of a spring 178 disposed between the foot pedal 170 and the supporting member 54 of the aerial platform 3. In this manner, the operator who may have equipment in his hands performing various operations may actuate the cylinder 172 with his foot in order to raise and lower the boom member 4.

In operation, the engine 46 is activated to commence the pumping action of the double hydraulic pump 48 which moves hydraulic fluid through both of a pair of outflow lines 84 and 86 to a transmission control valve 88 whereupon the operator may, from the aerial platform 3, select the hydraulic volume desired and thereby regulate the speed and power of the apparatus 1 while maintaining the engine at maximum power and maximum efficiency. The operator who is now positioned within the aerial platform 3 with the engine 46 operating is able to regulate the movement of the vehicular portion 2 and the aerial platform 3 by operation of various control handles within the aerial platform 3.

In order to elevate the boom 4 and thereby elevate the platform 3, the operator need only press with his foot on the foot pedal 170 forcing said foot pedal downwardly on the spring side of the pivot 176 causing the spool 172 to rise upwardly in the casing 172 of the control valve 106 thereby effecting a flow of hydraulic fluid from the control valve 104 through flow line 112 to cylinder 76, thereby actuating cylinder 76 causing the boom to commence a rising action. When the desired height is reached, it is merely necessary to remove pressure from the foot pedal 170 causing the spring 178 to move the spool 172 to a neutral position within the casing 172 thereby diverting the flow of fluid through line 110 to the tank 38.

The vehicular portion 2 of the apparatus 1 may be maneuvered in any of a multitude of patterns to reach a desired location along a precisely controlled path of travel such that the aerial platform 3 may be literally inched along a treacherous path avoiding various obstructions and entanglements diminishing the danger of injury to the operator caused by engagement with foreign objects. In order to maneuver the vehicular portion 2, of the apparatus 1, the rear driven wheels 16 and 18 may be actuated in either forward or reverse directions, either simultaneously in the same direction, singularly with the other of said wheels being fixed in position or with said wheels moving in opposite directions effecting a very short turning radius for the apparatus 1. In order to control the movements of the driven wheels 16 and 18, it is merely necessary for the operator facing rearwardly of the apparatus 1 to actuate the control handle 152 in the desired direction of travel, for instance, should the operator desire to move rearwardly, he would simply move the control handle 152 rearwardly of his position or forwardly of the apparatus 1.

If the operator desires to move the apparatus to his front or rearwardly in relation to the apparatus 1, he would move the control handle 152 forward relative to his position thereby rotating the pivot arm 142 and the cylinder 148 causing the linkage 140 to be depressed and the linkage 138 to be raised. As the control valves 92 and 94 are reversely connected, the raising of spool 134 of control valve 92 and the lowering of spool 134 of control valve 94 both effect a rearward movement of the wheels 16 and 18 simultaneously causing the forward movement of a rearwardly facing operator in the aerial platform 3. The opposite actuation of the control handle 152 effects an opposite movement of the apparatus 1.

When the operator desires a rapid turning action or a turning action on a very short radius, the driven wheels 16 and 18 may be reversely directed or, in other words, one of said wheels may be rotated forwardly while the other of said wheels is rotated reversely to effect a turn on a point centered between said driven wheels 16 and 18. As illustrated in FIG. 5, the control handle is either moved inwardly or outwardly from the operator toward either his left or right depending upon the direction he desires to turn or to move the bucket 3. This movement of the control handle 152 causes a second cylindrical pivot member 160 to rotate on the pin 168 thereby either raising or lowering the arms 138 and 140 simultaneously causing the flow of hydraulic fluid from the control valves 92 and 94 respectively to the motors 20 and 22 on opposite sides thereof to effect an opposite movement of the driven wheels 16 and 18. Where it is desired to actuate only one of the wheels and turn the apparatus 1 at a point at ground contact with the other of said driven wheels, the control handle 152 is first moved forwardly or rearwardly of the operator depending upon the direction in which the turn is desired and is then moved to the left or right of the operator causing both of the spools 134 of the control valves 92 and 94 to be either raised or lowered, but causing only one of said spools to properly align to allow the flow of hydraulic fluid through the control valve and to the motor for rotation of the apparatus 1 in the desired direction.

It may readily be seen that the emplyment of this new and novel control system with the features of the apparatus 1 develop a high versatile easily maneuverable apparatus for the deployment of personnel and equipment with controlled accuracy and precision of the nature required in moving personnel and equipment at various elevations in highly congested areas. The apparatus 1 may be fully controlled by a single operator from elevated positions within the aerial bucket or platform 3 allowing the operator to quickly maneuver along a precise path to work areas without unnecessary vertical movement of the platform in order to obtain horizontal movement of the vehicular portion 2 to thereby greatly facilitate the work output in a plurality of areas.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. An apparatus for the efficient deployment of personnel and equipment in a plurality of locations and elevations comprising:
    (a) a frame having a forward and rearward portion, said frame being T-shaped and having a stem member and a cross bar member,
    (b) a pair of independently driven spaced wheels operatively mounted at said rearward portion of the frame at the opposed ends of said cross bar member,
    (c) a vertical support member fixed on said stem portion adjacent the forward portion of the frame, a frame extension fixed on the support member and extending forwardly therefrom,
    (d) a caster wheel operatively connected to said frame extension forwardly of the support member,
    (e) means operatively connected to said frame at the forward portion thereof for elevating personnel and equipment including means for supporting personnel and equipment and a boom member swingingly connected to the vertical support member in upwardly spaced relation to the stem portion of the frame, said boom member extending longitudinally of said frame over said rearward portion, said boom being angularly bent rearwardly and downwardly to provide a low silhouette of both the personnel support and the boom support member when in lowered position, said supporting means including control means for the control of apparatus,
    (f) means mounted on said frame and operatively connected to said driven wheels for independently driving said wheels.

2. An apparatus as recited in claim 1 wherein said frame includes a portion defining a hydraulic fluid tank operatively connected to the forward end portion of said stem portion forwardly of the vertical support member whereby weight of fluid in the tank aids in stabilizing weight of the personnel support, said caster wheel being operatively connected to said tank defining portion.

3. An apparatus as recited in claim 2 wherein said T-shaped frame has the stem and cross bar portion formed of tubular members adapted to house hydraulic lines and other control apparatus, said tubular members having torsional strength and rigidity increasing stability of the frame when the boom is in raised position.

4. An apparatus as recited in claim 1 wherein said means for independently driving said driven wheels is comprised of a pair of hydraulic motors having positive drive connections to said driven wheels, means operatively connected to said motors for providing fluid pressure to said motors responsive to the control means in said support means and said control means having valves operative to control and stop flow of fluid to the motors.

5. In an apparatus for the deployment of personnel and equipment having a vehicular portion with a pair of hydraulic motors each independently connected to a driven wheel with an aerial platform operatively connected to said vehicular portion by a boom member, a control system including:
    (a) means operatively connected to each of said motors for providing fluid pressure to said motors,
    (b) a pair of control valve means operatively mounted on said platform and connected to said pressure flow provision means to control fluid pressure flow to each of said motors,
    (c) said control valve means including a pair of control valves each having a movable means operatively connected therein to control the flow of hydraulic fluids through the respective valves,
    (d) a single actuating means operatively connected to each of said movable means in said control valve means whereby movement of the movable means is responsive to the actuating means to control the flow of hydraulic fluid to said motors, said single actuating means simultaneously actuating said movable means whereby said motors may be operated singularly and in cooperative association for moving the vehicular portion in a desired manner.

6. A control system as recited in claim 5 wherein said means for providing fluid pressure to said motors includes a variable volume pumping means and wherein said control system includes means on said platform for controlling the volume output of said pumping means to control the speed and power of said apparatus.

7. A control system as recited in claim 5 wherein the movable means in said control valves include return means for returning said movable means to a neutral position, thereby stopping flow to said motors whereby release of said actuating means allows the return of said movable means to said neutral position imposing a static hydraulic condition on the motors effecting a braking action on said driven wheels.

8. In an apparatus for the deployment of personnel and equipment having a vehicular portion with a pair of hydraulic motors each independently connected to a driven wheel with an aerial platform operatively connected to said vehicular portion by a boom member, a control system including:
    (a) means operatively connected to each of said motors for providing fluid pressure to said motors,
    (b) a pair of control means operatively mounted on said platform and connected to said pressure provision means to control fluid pressure to each of said motors,
    (c) a single actuating means operatively connected to each of said control means to simultaneously actuate said control means whereby said motors may be operated singularly and in cooperative association for moving the vehicular portion in a desired manner,
    (d) said control means including a pair of control valves each having a movable means operatively connected therein to control the flow of hydraulic fluid through said valve, said movable means in each of said control valves being connected to said actuating means and responsive to movement of said actuating means to control the flow of hydraulic fluid to said motors,
    (e) said actuating means being comprised of a transverse pivot pin, a first longitudinal member swingably mounted to said pivot pin, and means connected to said pivot pin for effecting a swinging movement of said pin, said first member having opposed end portions operatively connected to the movable means in said control valves, said movable means being oppositely displaced responsive to a swinging movement of said first member to set said valves in a first condition and wherein said pivot pin is secured to said means for effecting a swinging movement of said pivot pin to move said movable means in said valves to a second condition.

9. A control system as recited in claim 8 wherein said means for effecting a swinging movement of said pivot pin is comprised of a second pivot pin rotatably mounted to said aerial platform and having its longitudinal axis transversely extending to the longitudinal axis of said first pivot pin.

References Cited
UNITED STATES PATENTS

| | | | |
|---|---|---|---|
| 2,954,092 | 9/1960 | Trump | 182—2 |
| 2,970,667 | 2/1961 | Bercaw | 182—2 |
| 3,043,394 | 7/1962 | Hall | 182—2 |
| 3,250,343 | 5/1966 | Maloney | 182—14 |
| 3,319,739 | 5/1967 | Morse | 182—2 |

REINALDO P. MACHADO, *Primary Examiner.*